United States Patent
Liu et al.

(10) Patent No.: US 8,332,880 B2
(45) Date of Patent: Dec. 11, 2012

(54) INFORMATION STORAGE DISK DISPENSING APPARATUS WITH A DISK INCLINING MEMBER

(75) Inventors: Ming-Hsun Liu, Taipei (TW); Chung-Hsuan Tsai, Taipei (TW)

(73) Assignee: Ming-Hsun Liu, Taipei (TW)

( * ) Notice: Subject to any disclaimer, the term of this patent is extended or adjusted under 35 U.S.C. 154(b) by 1192 days.

(21) Appl. No.: 12/068,255

(22) Filed: Feb. 5, 2008

(65) Prior Publication Data
US 2009/0199224 A1    Aug. 6, 2009

(51) Int. Cl.
*G11B 17/03* (2006.01)
*G11B 17/04* (2006.01)
*G11B 33/02* (2006.01)
*G11B 17/22* (2006.01)

(52) U.S. Cl. .................................. 720/615; 369/30.34

(58) Field of Classification Search ............... 369/30.34, 369/30.55, 30.57, 30.6, 30.93–30.98, 30.61; 101/4, 35, 40–44; 347/2–4, 104, 108; 414/797.4–798.1, 411; 720/632–635, 615
See application file for complete search history.

(56) References Cited

U.S. PATENT DOCUMENTS

| 5,910,939 | A  | * | 6/1999  | Shiba et al. ............. 369/30.57 |
| 5,975,839 | A  | * | 11/1999 | Ashby ..................... 414/798.1 |
| 7,624,406 | B2 | * | 11/2009 | Liu et al. ..................... 720/600 |
| 7,940,608 | B2 | * | 5/2011  | Liu et al. ................... 369/30.28 |
| 2003/0002400 | A1 | * | 1/2003 | Klein ...................... 369/30.55 |
| 2005/0007896 | A1 | * | 1/2005 | Haas ........................ 369/30.6 |
| 2008/0244627 | A1 | * | 10/2008 | Kubin et al. .................. 720/601 |
| 2009/0025020 | A1 | * | 1/2009 | Kahle ........................ 720/615 |

FOREIGN PATENT DOCUMENTS

| EP | 1463051 A2 | 9/2004 |
| EP | 1463051 A3 | 10/2007 |
| JP | 2004273065 | 9/2004 |

* cited by examiner

*Primary Examiner* — Craig A. Renner
*Assistant Examiner* — Gustavo Polo
(74) *Attorney, Agent, or Firm* — Rosenberg, Klein & Lee

(57) ABSTRACT

An information storage disk dispensing apparatus includes a frame, a disk drive and a disk inclining member. The disk drive is connected to the frame and includes a tray. The tray includes a receiving area and has an ejected position. The disk inclining member is mounted on the frame over the receiving area of the tray when the tray is at the ejected position to incline a disk pulled by gravity to fall vertically.

16 Claims, 4 Drawing Sheets

INFORMATION STORAGE DISK DISPENSING APPARATUS WITH A DISK INCLINING MEMBER

BACKGROUND

1. Field of the Invention

The present invention relates to an information storage disk dispensing apparatus. More particularly, the present invention relates to an information storage disk dispensing apparatus that vertically dispenses disks onto a tray of a disk drive with a disk inclining member to incline the dispensed disk to prevent the dispensed disk from colliding with the drive before the dispensed disk contacts the tray.

2. Description of Related Art

Information storage disks, such as compact disks (CDs) including Compact Disc-Recordable (CD-R), Compact Disc ReWritable (CD-RW), DVD recordable (DVD-R) etc. are popular and are used to store digital information in a variety of formats. Disk dispensing apparatus has been developed to provide or feed one disk once for disk replication devices, disk vending machines etc. to use or sell.

For convenient purposes, automatic disk dispensing apparatus becomes more common. The automatic disk dispensing apparatus uses a disk feeding mechanism or a robot arm to transport or feed one disk such as a blank compact disk onto a tray to duplicate or sell. One kind of the automatic disk dispensing apparatus feeds the disk vertically onto the tray i.e. the disk is pulled by gravity to fall down onto the tray when the disk is released from the disk feeding mechanism or the robot arm.

Refer to FIG. 1. For example, for an automatic disk duplication system, a disk drive 100 such as a compact disk drive or a burner is positioned under the disk dispensing apparatus to receive a fallen disk 200 in its tray 110 so that the disk drive 100 could read or write the disk 200. The tray 110 is retractably mounted in a body 120 of the disk drive 100 and has a receiving area 111 to receive and hold the disk 200 in position. The receiving area 111 is generally a circular recess with a diameter grater than the diameter of the disk 200. Typically, when the tray 110 is ejected out of the body 120, the receiving area 111 is not completely exposed out of the body 120. A small inside portion 112 is still hidden by the body 120.

However, the disk 200 has to be aligned with the receiving area 111 so as to be exactly received and held in the receiving area 111 when the disk 200 is pulled to fall vertically by gravity. Since the hidden inside portion 112 and the needs of alignment between the disk 200 and the receiving area 111, the edge of the falling disk 200 will collide with the top corner 121 of the body 120 before the disk 200 contacts with the tray 110. Hence, the falling disk 200 deviates from its path of motion and cannot be received by the receiving area 111. Automatic operations are stopped following the collision and cannot be executed.

Therefore, there is a need to provide an improved disk dispensing apparatus for information storage disks to mitigate or obviate the aforementioned problems.

SUMMARY

An object of the present invention is to provide a disk dispensing apparatus for information storage disks that supplies a disk onto a tray with smooth and exact positioning effect.

An information storage disk dispensing apparatus in accordance with the present invention comprises a frame, a disk drive and a disk inclining member. The disk drive is connected to the frame and comprises a tray. The tray comprises a receiving area and has an ejected position. The disk inclining member is mounted on the frame over the receiving area of the tray when the tray is at the ejected position to incline a disk pulled by gravity to fall vertically.

When using a disk-feeding mechanism to gradually and sequentially feed the disk onto the tray (only one single disk is fed once), the disk is eventually pulled down by gravity after the disk is released by the disk-feeding mechanism. When the falling disk touches the disk inclining member, the disk is inclined by the disk inclining member because of gravity until a lower portion of the edge of the disk touches the receiving area of the tray. Gravity continuously pulls the disk so that the lower portion of the edge of the disk slides on the receiving area of the tray toward the inside of the disk drive while an upper portion of the of the edge of the disk slides simultaneously on the disk inclining member. The disk is eventually received in the receiving area of the tray after the upper portion of the of the edge of the disk slides out of the disk inclining member, and the disk is pulled by gravity to fall onto the receiving area. Since the lower portion of the edge of the disk slides initially on the receiving area of the tray, the lower portion never collides with the disk drive. Thus, the receiving area of the tray receives the disk smoothly and precisely. Smooth and precise positioning effects for feeding the disk onto the receiving area of the tray can be obtained.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
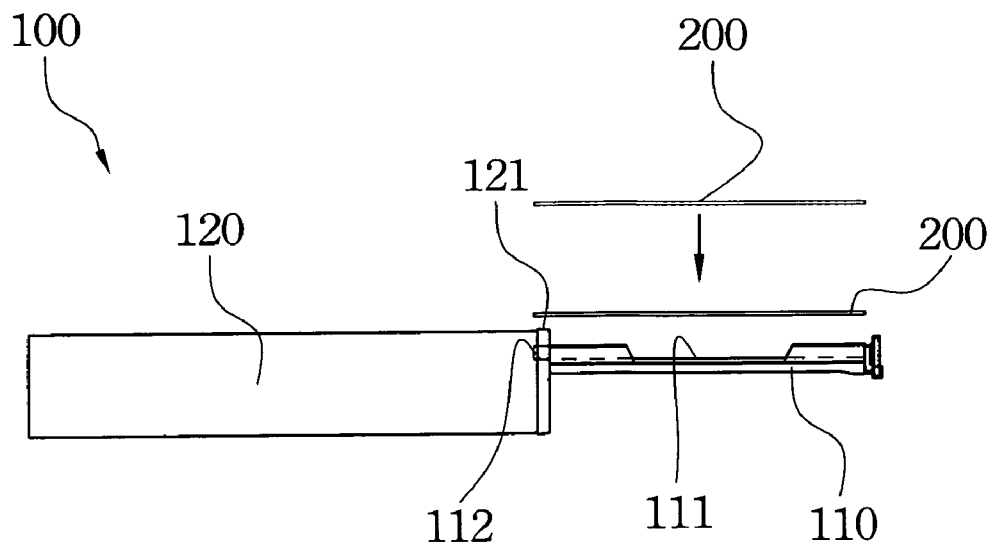
FIG. 1 is a schematic view illustrating a falling disk colliding with a disk drive in accordance with prior art.

Reference will now be made in detail to the present preferred embodiments of the invention, examples of which are illustrated in the accompanying drawings. Wherever possible, the same reference numbers are used in the drawings and the description to refer to the same or like parts.

Figure 2:
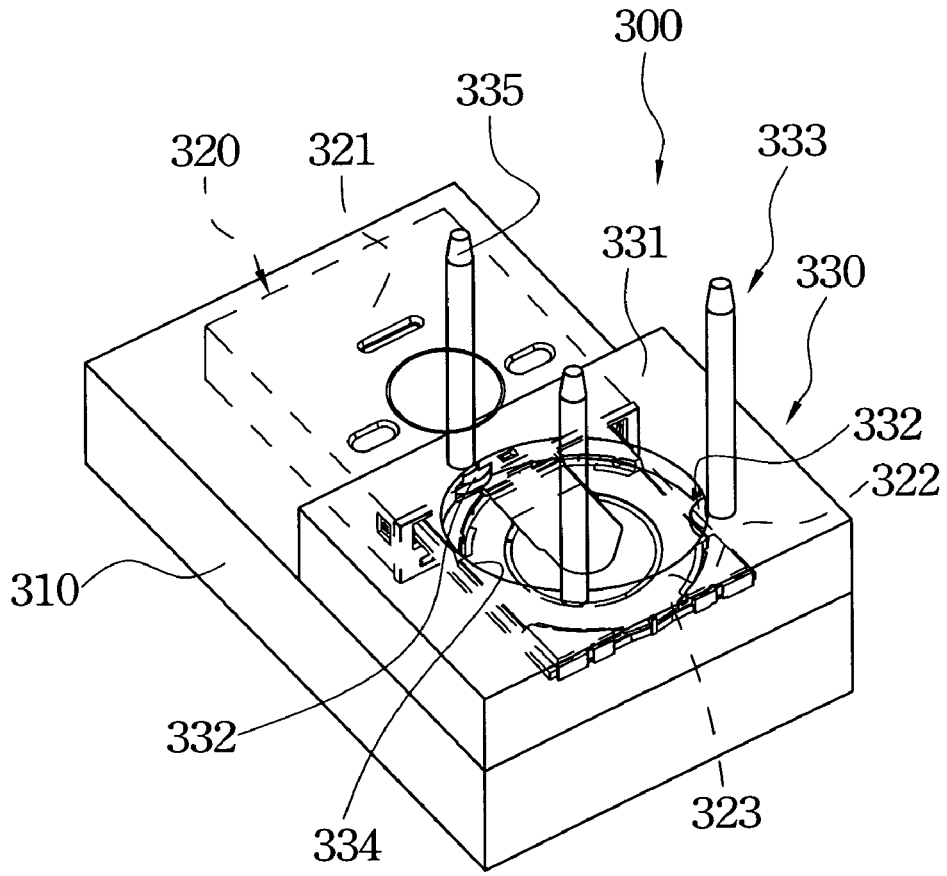
FIG. 2 is a perspective view of a first embodiment of a disk dispensing apparatus in accordance with the present invention.
Figure 3:
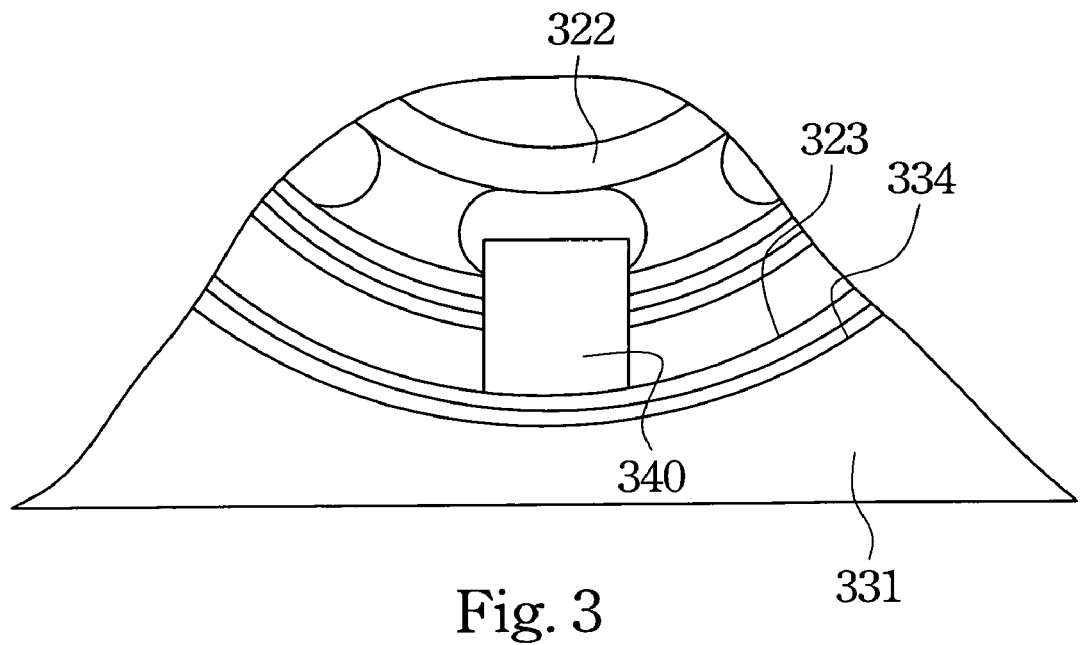
FIG. 3 is a partial top view of a disk inclining member of the disk dispensing apparatus in FIG. 2.

Refer to FIG. 2 and FIG. 3. An embodiment of a disk dispensing apparatus 300 comprises a frame 310, a disk drive 320, a disk-feeding mechanism 330 and a disk inclining member 340. The frame 310 supports the disk drive 320 and the disk-feeding mechanism 330.

The disk drive 320 comprises a body 321 and a tray 322. The tray 322 is retractably mounted in the body 321 between an ejected position and a retracted position. The tray 322 comprises a receiving area 323 that is typically a circular recess with a diameter grater than the diameter of a disk.

Figure 4:
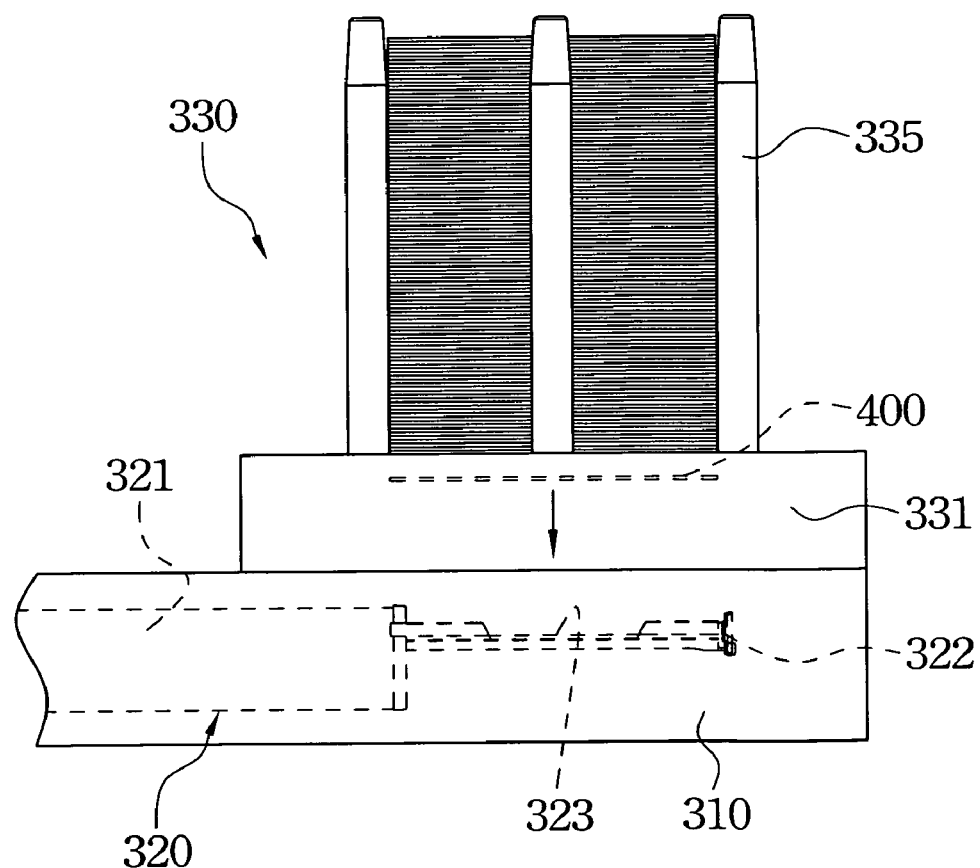
FIG. 4 is an elevated view of the disk dispensing apparatus in FIG. 2.

Further refer to FIG. 4. The disk-feeding mechanism 330 is mounted on the frame 310 to supply vertically one disk 400 onto the receiving area 323 of the tray 322 when the tray 322 is ejected at its ejected position. In the embodiment, the disk-feeding mechanism 330 comprises a disk-feeding body 331, multiple disk-feeding wheels 332 and a disk-guiding device 333.

The disk-feeding body 331 is mounted on the frame 310 and has a through hole 334 aligned with the receiving area 323 of the tray 322 as the tray 322 at its ejected position. The disk-feeding wheels 332 are rotating members, are mounted in the through hole 334 and are partially extended in the through hole 334. The amount of disk-feeding wheels 332 depends on design requirements. In the embodiment, there are three disk-feeding wheels 332. Those three disk-feeding wheels 332 have a triangular arrangement.

The disk-guiding device 333 is mounted on the disk-feeding body 331 around the through hole 334 to align the stacked blank disks 400 in position. The disk-guiding device 333 comprises two or more than two guiding posts 335. In the embodiment, the disk-guiding device 333 comprises three guiding posts 335.

The disk inclining member 340 is mounted on the frame 310 under the through hole 334 and over the receiving area 323 of the tray 322 when the tray 322 is ejected at its ejected position. The disk inclining member 340 may be a flexible strip, a rigid strip, a nub etc. and is partially extended toward the center axis of the receiving area 323.

Refer to FIG. 4 and FIG. 5a to FIG. 5c. When using the disk-feeding mechanism 330 to gradually and sequentially feed the disk onto the trays (only one single disk is fed once), a controller controls rotations of the disk-feeding wheels 332. Rotations of the disk-feeding wheels 332 move the bottom disk 400 of the disk stack. The disk 400 is eventually pulled down by gravity after the disk passes through the through hole 334. When the bottom disk 400 departs from the disk-feeding wheels 332 and falls, the wheels 332 stop. Thus, the disk-feeding mechanism 330 controls feeding a single disk onto the tray at a time.

Figure 5A:
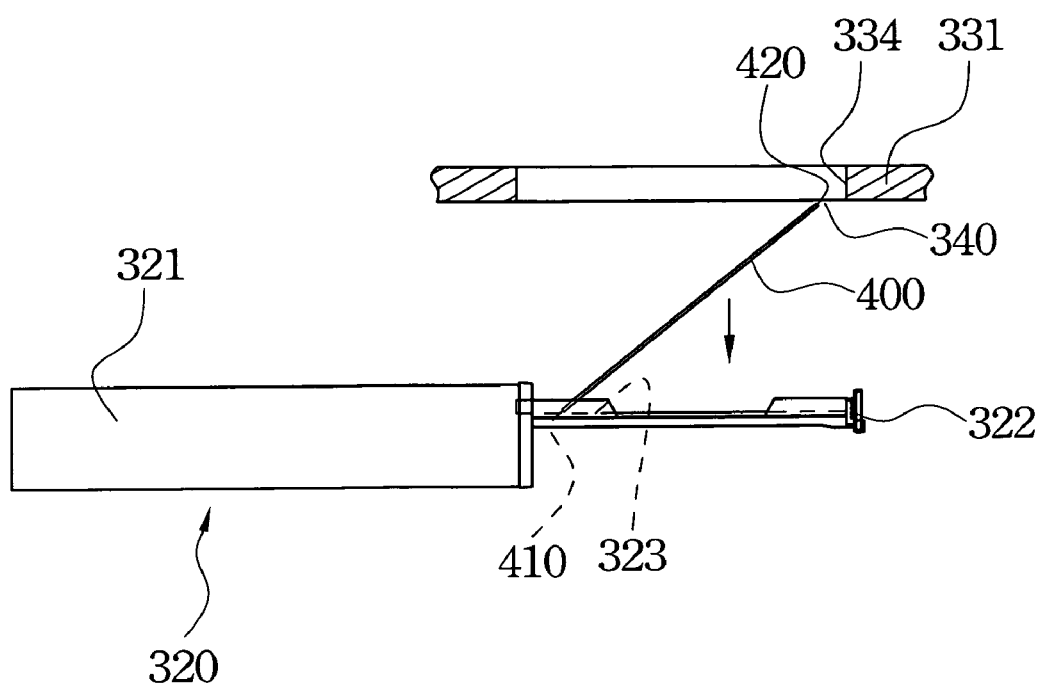
FIG. 5*a* to FIG. 5*c* are schematic, operational views illustrating the disk inclining member inclining a disk so as to supply the disk onto a receiving area of a tray of a disk drive.
Figure 5B:
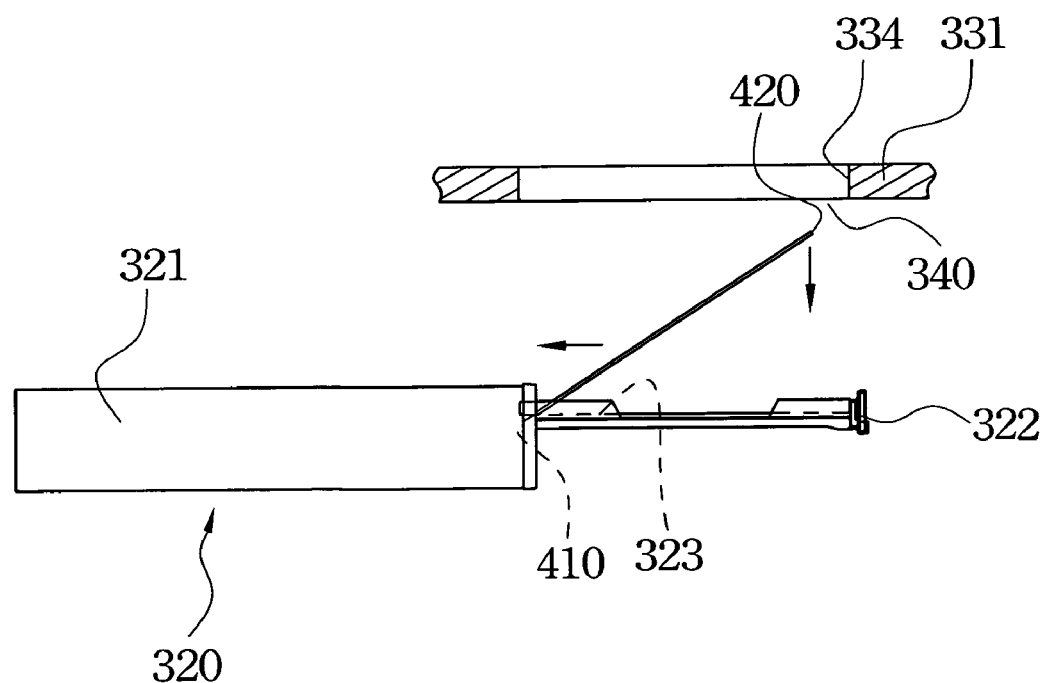
Figure 5C:
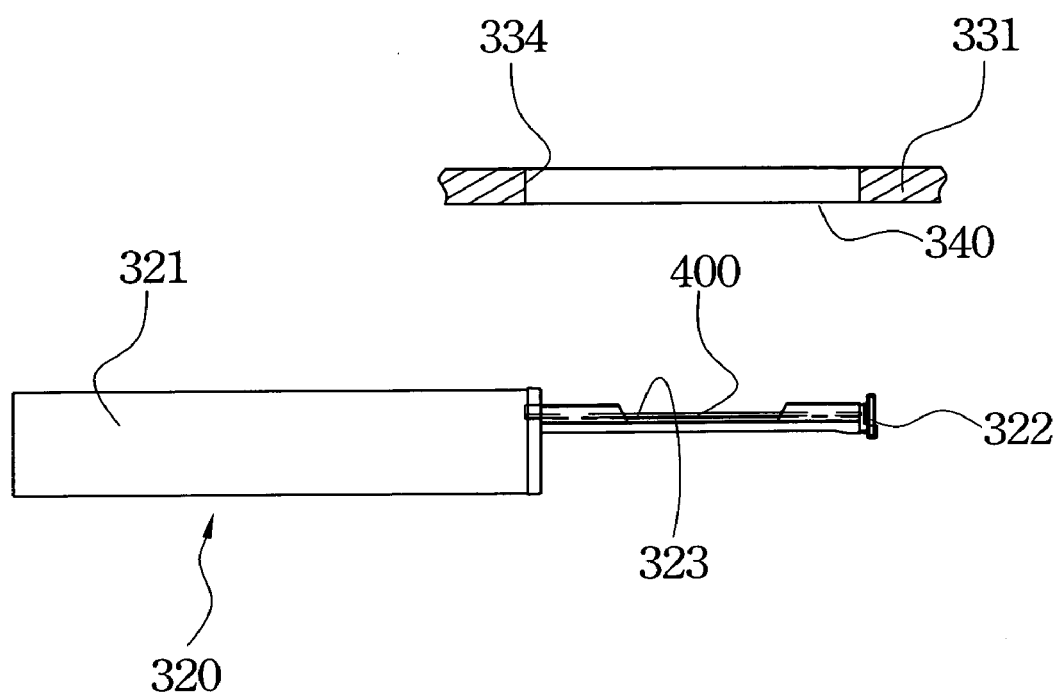

When the falling disk 400 touches the disk inclining member 340, the disk 400 is inclined by the disk inclining member 340 because of gravity until a lower portion 410 of the edge of the disk 400 contacts with the receiving area 323 of the tray 322 (as shown in FIG. 5a). Gravity pulls continuously the disk 400 so that the lower portion 410 of the edge of the disk 400 slides on the receiving area 323 of the tray 322 toward the inside of the body 321 of the disk drive 320 while an upper portion 420 of the of the edge of the disk 400 slides simultaneously on the disk inclining member 340 as denoted by the arrows in FIG. 5b. The disk 400 is eventually received in the receiving area 323 of the tray 322 after the upper portion 420 of the of the edge of the disk 400 slides out of the disk inclining member 340, and the disk 400 is pulled by gravity to fall onto the receiving area 323 as shown in FIG. 5c. Since the lower portion 410 of the edge of the disk 400 slides initially on the receiving area 323 of the tray 322, the lower portion 410 never collides with the top corner of the body 321 of the disk drive 320. Thus, the disk 400 is smoothly and exactly received and held in the receiving area 323 of the tray 322. The tray 322 is retracted inward to read or write the disk 400.

Figure 6:
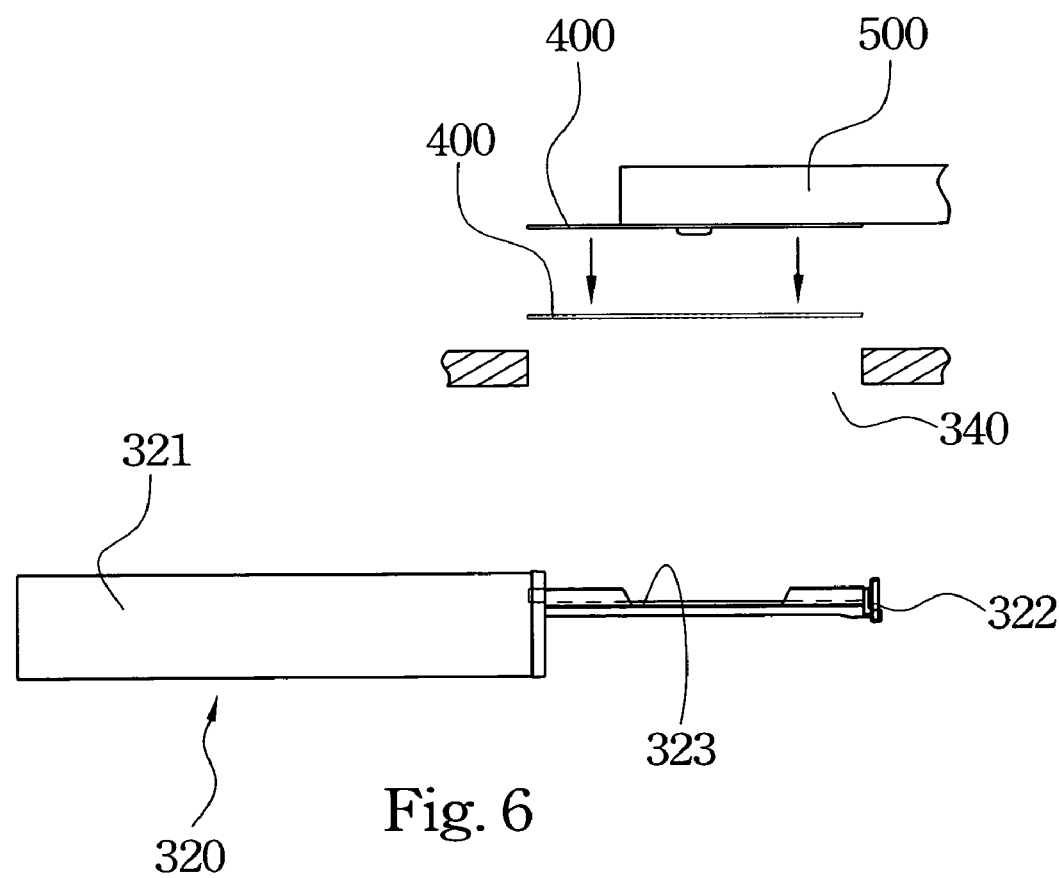
FIG. 6 is a schematic view illustrating a second embodiment of a disk dispensing apparatus in accordance with the present invention using a robot arm to feed a disk.

Refer to FIG. 6. Another embodiment discloses uses an automatic robot arm 500 as a disk-feeding mechanism to convey a disk 400 and supplies the disk 400 to the tray 322 of the disk drive 320. Likewise, when the robot arm 500 positions disk 400 over the receiving area 323 of the tray 322 and releases the disk 400, the disk 400 is pulled by gravity to fall. The falling disk 400 is inclined by the disk inclining member 340 as previously described and eventually received and held in the receiving area 323 of the tray 322 to process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An information storage disk dispensing apparatus comprising:
   a frame having a through hole, the through hole having an edge;
   a disk drive connected to the frame and comprising a tray, and the tray comprising a receiving area and having an ejected position;
   a disk-feeding mechanism mounted on the frame to enable a disk to fall vertically; and
   a deformable disk inclining member mounted at the edge of the through hole of the frame far from the disk drive over the receiving area of the tray when the tray is at the ejected position, wherein the deformability of the deformable disk inclining member retards the fall of one side of the disk for inclining the disk when the disk fell from the disk-feeding mechanism.

2. The apparatus as claimed in claim 1, wherein the disk inclining member is a flexible member.

3. The apparatus as claimed in claim 1, wherein the disk inclining member is a strip.

4. The apparatus as claimed in claim 1, wherein the disk inclining member is a nub.

5. The apparatus as claimed in claim 1, wherein the disk-feeding mechanism comprises:
   a disk-feeding body mounted on the frame and having a body through hole aligned with the receiving area of the tray as the tray is at its ejected position;
   multiple disk-feeding wheels rotatably mounted around the body through hole and partially extended into the body through hole; and
   a disk-guiding device mounted on the disk-feeding body around the body through hole.

6. The apparatus as claimed in claim 5, wherein the disk-guiding device comprises at least two guiding posts.

7. The apparatus as claimed in claim 1, wherein the disk-feeding mechanism comprises a robot arm.

8. An information storage disk dispensing apparatus comprising:
   a frame having a through hole, the through hole having an edge;
   a disk drive connected to the frame and comprising a tray, and the tray comprising a receiving area and having an ejected position;
   a disk-feeding mechanism to enable a disk to fall vertically comprising:
      a disk-feeding body mounted on the frame and aligned with the receiving area of the tray as the tray is at its ejected position;
      multiple disk-feeding wheels rotatably mounted around the through hole and partially extended into the through hole; and
      a disk-guiding device mounted on the disk-feeding body around the through hole; and
   a disk inclining member mounted at the edge of the through hole over a distal portion of the receiving area of the tray when the tray is in the ejected position, wherein the disk inclining member blocks one side of the disk for inclining the disk while the disk falls from the disk-feeding mechanism.

9. The apparatus as claimed in claim 8, wherein the disk inclining member is a flexible member.

10. The apparatus as claimed in claim 8, wherein the disk inclining member is a deformable member.

11. The apparatus as claimed in claim 10, wherein the deformability of the deformable disk inclining member retards the fall of one side of the disk for inclining the disk while the disk falls from the disk-feeding mechanism.

12. The apparatus as claimed in claim 11, wherein the deformability of the deformable disk inclining member further imparts a horizontal force component to the disk while the disk falls from the disk-feeding mechanism to deposit the disk into the receiving area of the tray.

13. The apparatus as claimed in claim 8, wherein the disk inclining member is a strip.

14. The apparatus as claimed in claim 8, wherein the disk inclining member is a nub.

15. The apparatus as claimed in claim 8, wherein the disk-guiding device comprises at least two guiding posts.

16. The apparatus as claimed in claim 8, wherein the disk-feeding mechanism comprises a robot arm.

* * * * *